April 21, 1970 C. E. PLYMALE 3,507,736
APPARATUS FOR FORMING NETTING OF EXTRUDED PLASTIC STRANDS
Filed Oct. 6, 1966

INVENTOR.
CHARLES E. PLYMALE
BY
Philip M. Rice &
W. A. Schaich
ATTORNEYS

United States Patent Office 3,507,736
Patented Apr. 21, 1970

3,507,736
APPARATUS FOR FORMING NETTING OF EXTRUDED PLASTIC STRANDS
Charles E. Plymale, Maumee, Ohio, assignor to Owens-Illinois, Inc., a corporation of Ohio
Filed Oct. 6, 1966, Ser. No. 584,820
Int. Cl. D04h *3/16*
U.S. Cl. 156—441                6 Claims

ABSTRACT OF THE DISCLOSURE

Forming plastic netting by extruding from a die a plurality of plastic strands in circular array; passing a first group of the strands respectively through apertures in a ring spaced axially from the die while passing a second group of the strands radially through the space enclosed by the ring; oscillating the ring to orient the first group of strands at an angle to the second group of strands in a zigzag pattern, and passing the first and second groups through two pressure forming members to bond them together at their points of intersection while in tacky condition. In one embodiment, the pressure forming members are formed by a sphere and surrounding ring defining an annular passage through which the strands are passed. Additionally, the forming sphere may be supported for universal movement in a spherical receptacle containing a coolant for cooling the forming members.

---

This invention pertains to the manufacture of netting and has for one of its objects the provision of an improved method and apparatus for producing netting from plastic or similar extrudable material.

Another object of the present invention is to provide a method and apparatus for making netting from extruded strands but without employing movable die parts in the formation of the netting.

A further object is the provision of such a method and apparatus which are relatively simple and efficient and yet capable of mass producing high quality netting.

Other objects and advantages will become apparent from the following description taken in conjunction with the accompanying drawings, in which.

Figure 1:
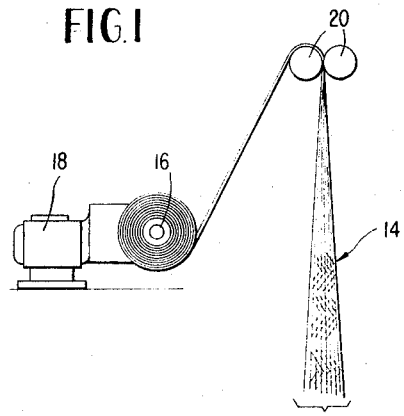
FIG. 1 is a perspective view of apparatus embodying the present invention.
Figure 2:
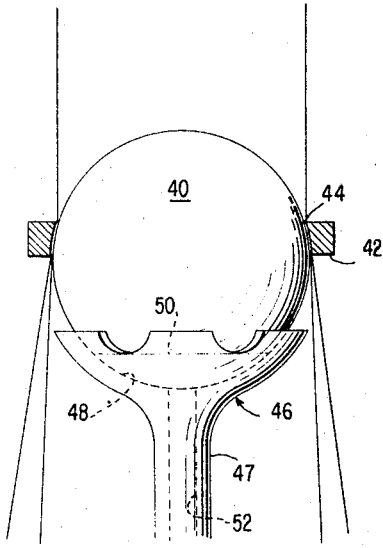
FIG. 2 is a partly cross-sectional elevational view of a portion of the apparatus shown in FIG. 1.
Figure 3:
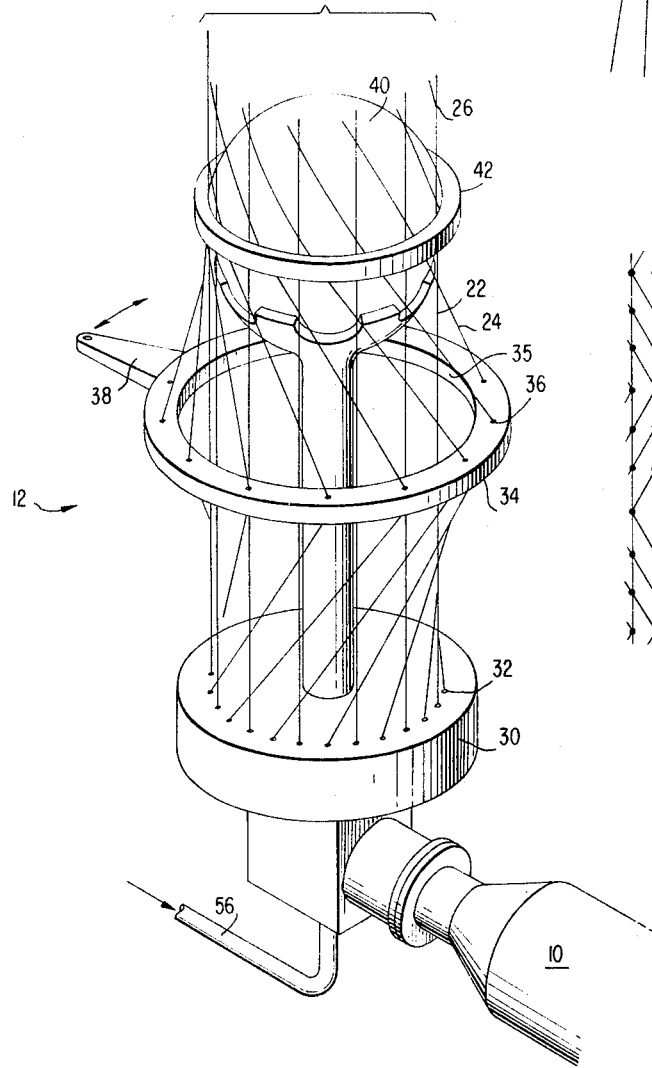
FIG. 3 is a diagrammatic view of a netting formed with the method and apparatus of the invention.
Figure 3:
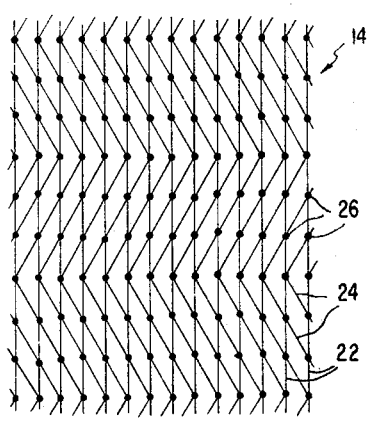

Referring now to the drawings in detail, FIG. 1 shows an extruder 10 which may be conventional, for forcing plastic or similarly flowable or extrudable material to a net forming apparatus generally designated 12 embodying the present invention. After the netting which is designated 14, is formed by the apparatus, it is stored on a supply roll 16 driven by a motor 18; the newly formed netting first passing through idler rollers 20 before being wound on supply roll 16. FIG. 3 illustrates one particular netting which may be formed in accordance with the present invention, the netting including a first group of parallel strands 22 intersected by a second group of parallel strands 24 which extend in a generally zigzag pattern obliquely with respect to the former and are bonded thereto at intersections 26.

Included in the illustrated apparatus 12 of the present invention is a die plate 30 having transversely formed therethrough in a circular array, a plurality of equally spaced extrusion passages 32 through which the strands are extruded by extruder 10. After the plastic strands leave die plate 30 they pass through a ring 34 situated in coaxial relation to die plate 30. Ring 34 has a plurality of equally spaced passages 36 arranged along a circle whose diameter is greater than that formed by die passages 32. Passages 36 receive alternate strands 24 issuing from die plate 30 with the remaining strands 22 passing through ring 34 in a straight line from die plate 30 as shown in FIG. 1. Ring member 34 is movable as will be described and functions to move alternate strands 24 in a direction generally transverse to the extrusion direction so as to orient strands 24 at an oblique angle with respect to remaining strands 22.

It is important that the radial spacing between ring passages 36 and the internal peripheral surface 35 of ring 34 or the radial spacing between passages 36 and the strands 22 be sufficient to avoid contact between strands 22 and 24 at the area of ring 34 which contact would otherwise cause premature bonding of strands 22 and 24. Although passages 36 have been illustrated as circular holes it will be appreciated that slots or other suitable means (not shown) may be employed to effect the connection between ring 34 and alternate strands 22 for carrying out the described function.

In order to produce the zigzag pattern of strands 24 as shown in FIG. 3 ring 34 is oscillatable about a vertical axis passing through its center and aligned with the center of die plate 30. Any suitable structure (not shown) may be employed for mounting and oscillating ring 34 such as through an arm 38 projecting radially from ring 34 as shown in FIG. 1.

After strands 22 and 24 pass ring 34 they advance to a forming apparatus to be bonded together; strands 22 advancing vertically in a straight line while strands 24 advancing obliquely with respect to strands 22 in a direction opposite to the direction during advancement from die plate 30 to ring 34. The forming apparatus consists of sphere or ball 40 formed of suitably rigid material and a surrounding forming ring 42 which define between them an annular passage 44 through which strands 22, 24 pass. Passage 44 is dimensioned such that ring 42 will press or weld strands 22 and 24 against ball 40 while the strands are hot or tacky to form intersections 26 between strand 22 and 24. After the desired number of intersections 26 are formed, oscillating ring 34 is moved in the opposite position and the subsequent intersections 26 are thus formed along a line which is oblique to those intersections previously formed. In this manner, the zigzag arrangement of strands 22 is achieved.

In the preferred embodiment forming ring 42 is supported by any suitable means (not shown) in stationary position while ball 40 is supported for universal rotation such as by the illustrated receptacle 46 which includes an upright stem 47 fixed at its base to die plate 30. The upper end of receptacle 46 has a semi-spherical depression 48 dimensioned to rotatably receive the lower section of ball 40. Preferably both the ball 40 and stationary ring 42 are cooled by suitable liquid such as water 50 held in receptacle depression 48. For supplying the receptacle with water, stem 47 is formed with a longitudinal passage 52 for carrying water from a supply line 56 below die plate 30 to receptacle depression 48.

In operation, plastic strands or the like are extruded from die plate 30 after which alternate strands 24 pass through apertures 36 in oscillating ring 34 and remaining strands 22 pass through the interior of ring 34. Movement of ring 34 in one direction orients strands 24 at the desired angle relative to strands 22 and this position of ring 34 is maintained for a predetermined time during which strands 22 and 24 subsequently pass through forming passage 44 where they are bonded together in tacky condition to form intersections 26. Next, ring 34 is moved into the opposite position for a predetermined amount of time during which intersections 26 continue to be formed by members 40 and 42 but at an opposite oblique angle so as to obtain the zigzag pattern. Upon cooling, strands 22 and 24 will be permanently bonded together at intersections 26. After the meshwork is so formed the netting finally passes through idler rolls 20 for storage on supply roll 16.

It will be appreciated that various dimensions may be imparted to the netting meshwork by selecting the appropriate spacing between extrusion passages 32 in die plate 30 and between passages 36 in oscillating ring 34. Also the angle of strands 24 relative to strands 22 may be varied by changing the amount of angular rotation of ring 34. The length of the segments of strands 24 between the oppositely extending portions thereof will depend upon the time between oscillation of ring 34 and thus may be accordingly varied to produce a desired netting pattern.

I claim:

1. Apparatus for forming netting comprising in combination, a die for extruding a plurality of plastic strands, a movable member spaced along the direction of extrusion and having means for orienting a number of said strands at an angle with respect to the remaining strands, and means for engaging said group of strands with the remaining strands while the strands are tacky to bond the group of strands to the remaining strands at their intersections to form a netting.

2. Apparatus defined in claim 1 wherein said movable member is a generally annular element and is apertured to receive said group of strands and move them generally in a transverse direction relative to the remaining strands.

3. Apparatus defined in claim 2 wherein said annular element is oscillatable about an axis passing through its center to produce a netting wherein said group of strands extends in a generally zigzag pattern.

4. Apparatus defined in claim 1 wherein said last-mentioned means includes a ball member and a surrounding annular member spaced from the ball member to receive the strands but to cause interengagement between said groups of strands and the remaining strands to bond them together and form the netting.

5. Apparatus defined in claim 4 further including means for rotatably supporting said ball member and having a cooling liquid for application to said ball member.

6. Apparatus defined in claim 5 wherein said last-recited means includes a stem supported on said die and having a semi-spherical depression in its upper end receiving said ball member, said stem having a longitudinal passage opening into said depression for supplying coolant liquid to said depression.

References Cited

UNITED STATES PATENTS

| | | | |
|---|---|---|---|
| 3,067,084 | 12/1962 | Nalle | 156—167 |
| 3,172,154 | 3/1965 | Martin et al. | |
| 3,242,023 | 3/1966 | Schultheiss | 156—167 |

PHILIP DIER, Primary Examiner

U.S. Cl. X.R.

18—12; 156—500, 167, 180; 264—167